UNITED STATES PATENT OFFICE.

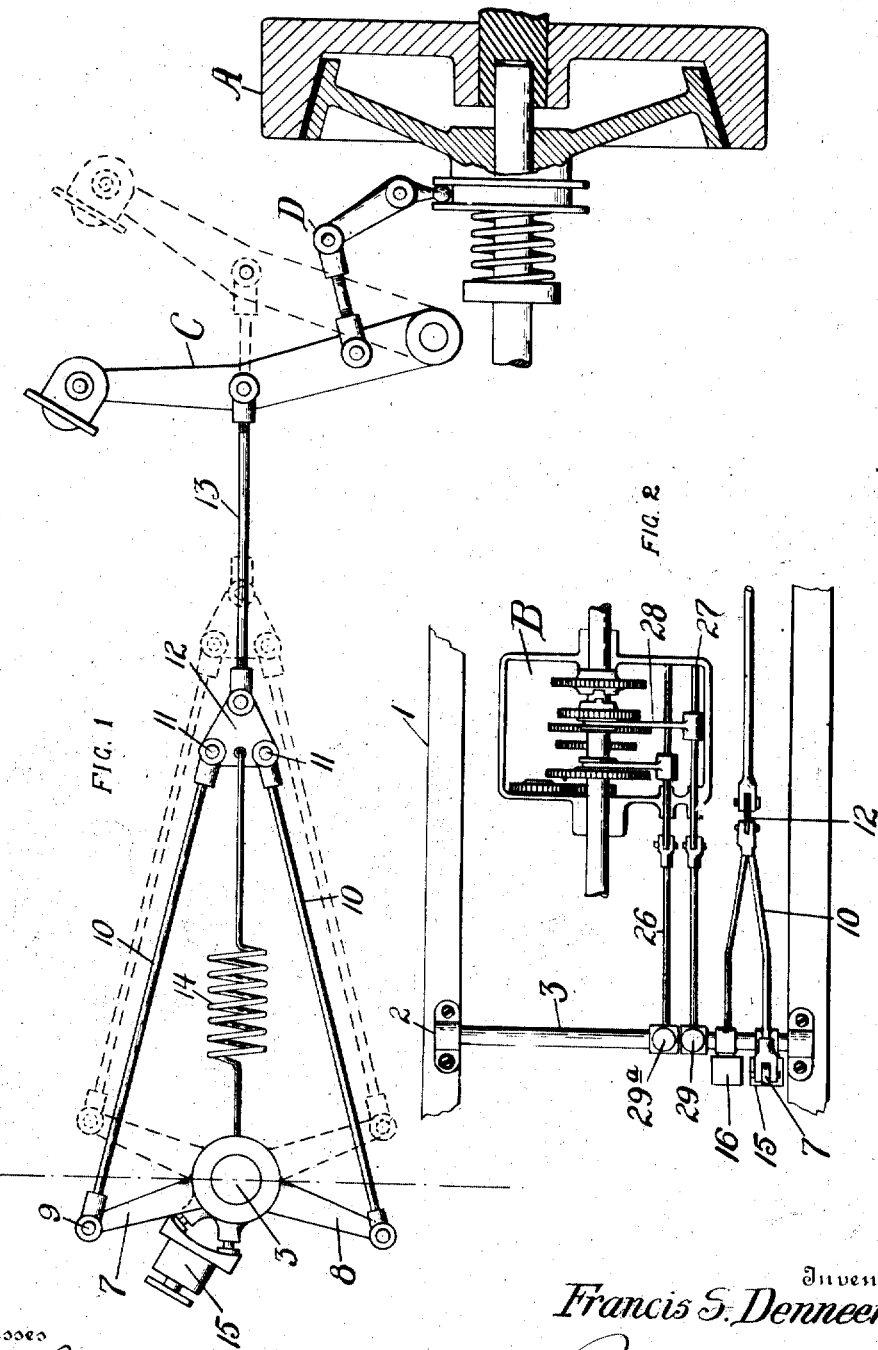

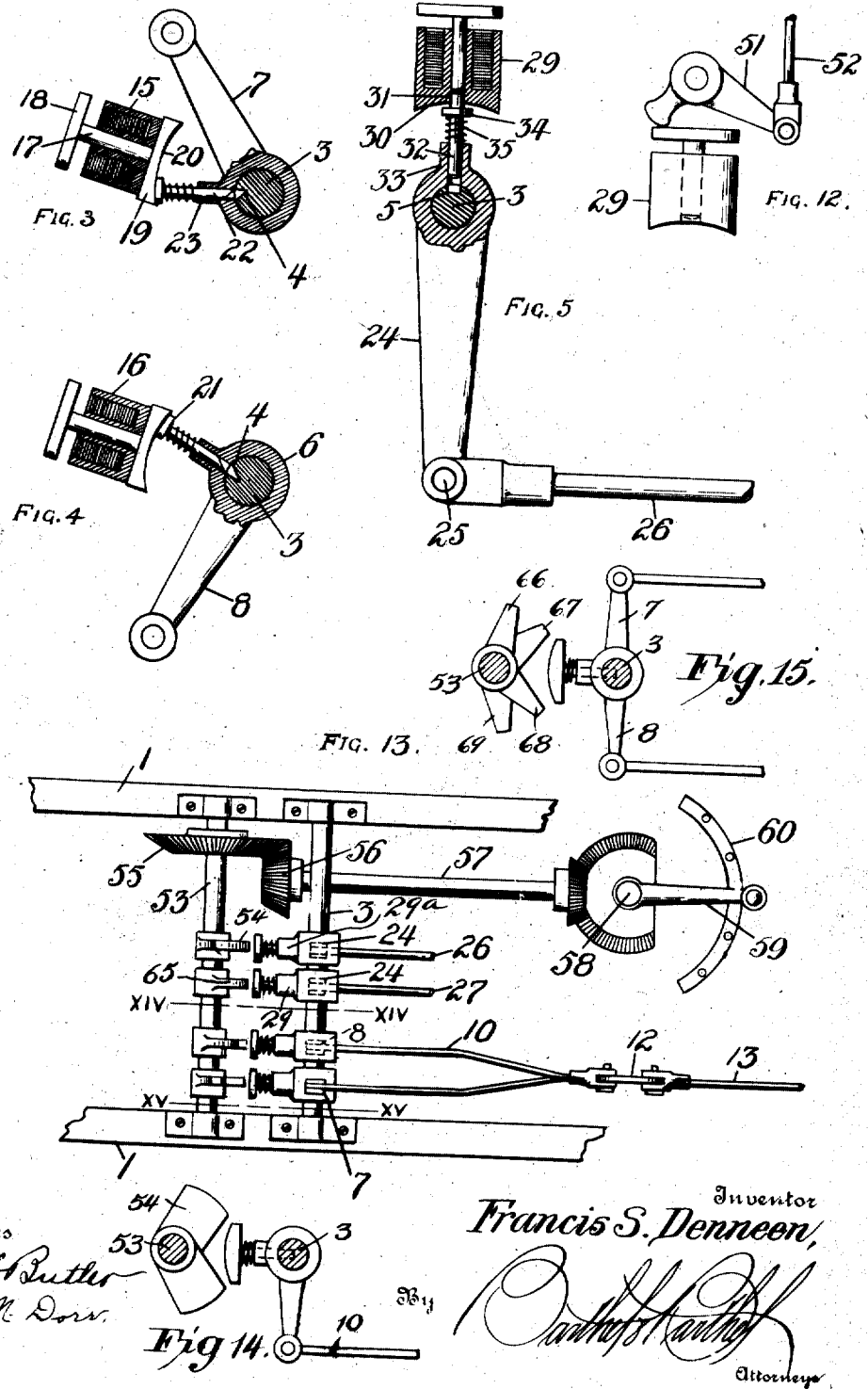

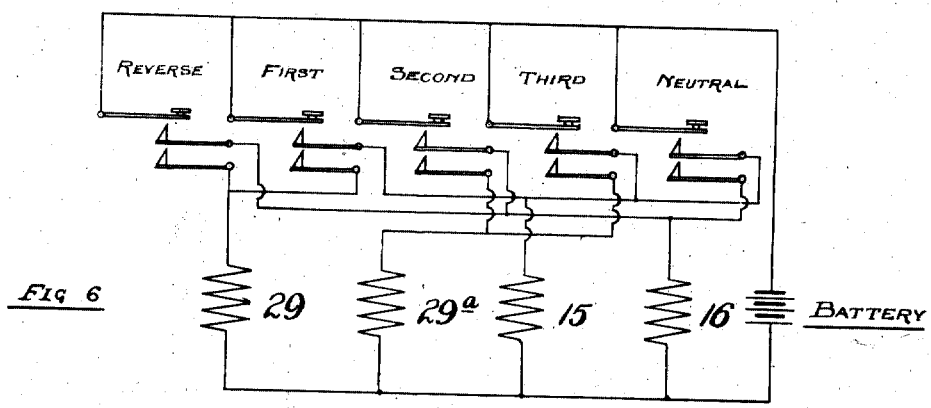
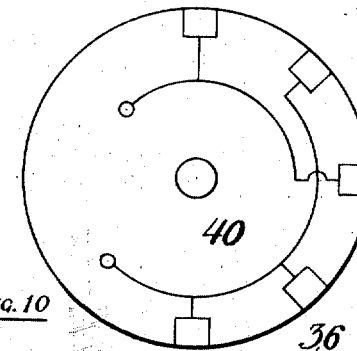
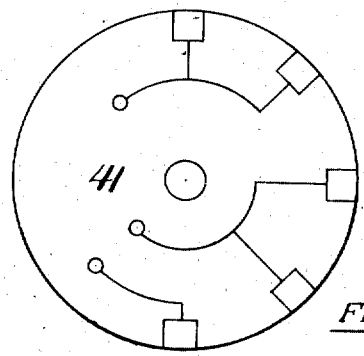
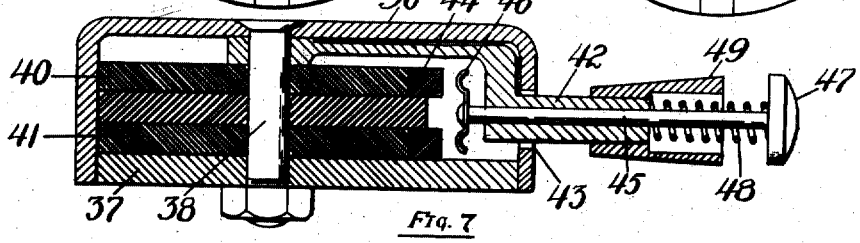
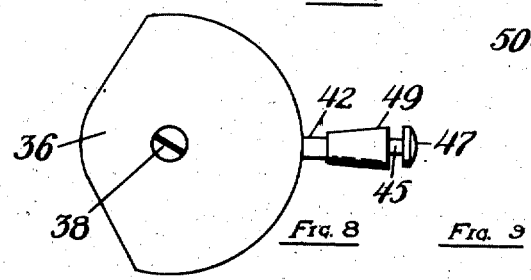
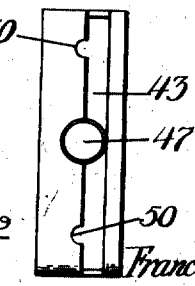

FRANCIS S. DENNEEN, OF DETROIT, MICHIGAN.

AUTOMATIC GEAR-SHIFTING MECHANISM.

1,218,750.

Specification of Letters Patent.

Patented Mar. 13, 1917.

Application filed September 12, 1913. Serial No. 789,415.

*To all whom it may concern:*

Be it known that I, FRANCIS S. DENNEEN, a citizen of the United States of America, residing at Detroit, in the county of Wayne and State of Michigan, have invented certain new and useful Improvements in Automatic Gear-Shifting Mechanism, of which the following is a specification, reference being had therein to the accompanying drawings.

This invention relates to an automatic gear shifting mechanism especially adapted for automobiles and other motor driven vehicles, and the objects of my invention are:

First, to eliminate the ordinary hand operated lever for shifting gears of a motor car thereby reducing to a minimum the danger of losing control of the car, the stripping or injuring of gears, and the necessity of moving a hand from the steering wheel of the car.

Second, to provide an automatic gear shifting mechanism wherein the shifting of gears can be accomplished by a foot or hand lever in connection with a selector mechanism in the form of either a series of electric buttons, a switch, a selector lever or a series of push rods.

Third, to provide an automatic gear shifting mechanism that coöperates with a clutch pedal in such a manner that the clutch must be first disengaged before any of the gears can be shifted, thereby eliminating the clashing and damaging of gears so common in the ordinary method of operation which permits gear shifting while the clutch is engaged, that is, while the engine is connected to the transmission mechanism.

The above and other objects are attained by a durable and easily installed mechanism that will be hereinafter specifically described and then claimed.

Reference will now be had to the drawings, wherein—

Figure 1 is a side elevation of a portion of the mechanism in connection with the clutch;

Fig. 2 is a plan of a portion of the mechanism in connection with a slide gear transmission mechanism;

Fig. 3 is a side elevation of an electrically actuated clutch, partially broken away and partially in section, employed for moving a shaft in one direction.

Fig. 4 is a similar view of the clutch for moving the shaft in the opposite direction;

Fig. 5 is a similar view of a gear operating finger or crank;

Fig. 6 is a diagrammatic view of the electrical connections of the mechanism;

Fig. 7 is an enlarged cross sectional view of a switch box that can be used in connection with the mechanism;

Fig. 8 is a plan of the same upon a smaller scale;

Fig. 9 is a side elevation of the same;

Figs. 10 and 11 are plans of detached switch disks;

Fig. 12 is a side elevation of the mechanical device that can be used in lieu of an electrical means;

Fig. 13 is a plan of another mechanical device;

Fig. 14, is a cross sectional view taken on the line XIV—XIV of Fig. 13, and

Fig. 15 is a similar view taken on the line XV—XV of Fig. 13.

In the drawings there is illustrated a clutch generally designated A and a sliding gear transmission mechanism generally designated B, these two devices being of the ordinary and well known type used in connection with motor cars. The clutch A is operated through the medium of the tread lever C and a toggle D, said clutch controlling the connection between transmission mechanism B and the engine of a motor car.

The reference numerals 1 denote the frames of a car and mounted upon these frames or otherwise supported are bearings 2 for a rock shaft or member 3. The rock shaft 3 has two sets of notches 4 and 5 and loosely mounted upon the rock shaft 3, over the notches 4, are the barrels 6 of fingers or cranks 7 and 8. The fingers or cranks are radially disposed and normally held in the rear of the shaft 3 and when moved are advanced to the forward side of the shaft 3, as illustrated by dotted lines in Fig. 1 of the drawings. The outer ends of the fingers or cranks 7 and 8 are pivotally connected as at 9 to connection rods 10. These rods are pivotally connected as at 11 to a triangular shaped coupling 12 which is pivotally connected by a rod 13 to the tread lever C employed for controlling the operation of the clutch A. The member 12 and its connections are held in a retracted position by a coiled retractile spring 14 connected to the member 12 and the shaft 3 or a support in proximity thereto. The retractile spring 14 is illustrated as a convenient means of retaining the fingers or cranks 7 and 8 in a retracted position.

Suitably supported in proximity to the barrels 6 of the fingers or cranks 7 and 8 are solenoids 15 and 16 having the cores 17 thereof provided with armatures 18 and heads 19. The heads 19 have concave outer faces 20 normally engaged by the heads 21 of spring pressed plungers 22. The plungers 22 are slidably mounted in bosses 23 carried by the barrels 6 of the fingers or cranks 7 and 8. The inner ends of the plungers 22 are beveled and are adapted to engage in the notches 4 of the shaft 3 to lock the fingers or cranks 7 and 8 in engagement with said shaft.

Loosely mounted upon the shaft 3 above the notches 5 are gear operating fingers or cranks 24 pivotally connected, as at 25, to reach rods 26 that are in turn connected to rods 27 extending into the housing of the slide gear transmission mechanism B. The rods 27 have the ordinary bifurcated arms 28 for moving the shiftable gears of the transmission mechanism.

Suitably supported above the fingers or cranks 24 are solenoids 29 and 29ª. The solenoids 29 have concave ends 30 and extending into the bores 31 of said solenoids are the outer ends of spring pressed plungers 32, which are slidably mounted in bosses 33 carried by the barrels of the fingers or cranks 24. The plungers 32 have collars 34 and encircling said plungers between the collars 34 and the bosses 33 are coiled compression springs 35. These springs are adapted to retain the outer ends of the plungers in engagement with the concave ends of the solenoids when the fingers or cranks 24 are shifted relatively to said solenoids. The plungers 32 are adapted to enter the notches 5 and lock or fix said fingers or cranks relatively to the shaft 3.

Reference will now be had to Figs. 6 to 11 inclusive illustrating electrical means for controlling the operation of the solenoids 15, 16, 29 and 29ª. The electrical means can be in the form of buttons or switches. As an instance of contact buttons, a series are illustrated in Fig. 6, the buttons being in circuit with a suitable source of electrical energy and the solenoids previously mentioned. The electrical connections shown are for operating an ordinary three forward speed and one reverse type of sliding gear transmission mechanism. The solenoids 29 and 29ª control the gear shifting arms 28, solenoid 15, controls finger or crank 7 which turns the shaft 3 clockwise, and solenoid 16, controls finger or crank 8 that turns the shaft 3 counter-clockwise. By pressing the reverse button the solenoids 15 and 29ª are energized and if the tread lever C is advanced with this circuit closed, the finger or crank which operates the reverse gear will be engaged with the shaft 3 and said shaft moved in a clockwise manner causing the gears to be drawn into position for reverse. The operation of the first, second and third speeds is exactly on the same principle and in going from reverse to first, first to second, or second to third in the transmission mechanism shown, it is only necessary to press the button for the first, second or third as desired and advance the tread lever C at the same time.

If the solenoids 15 and 16 on both of the cranks or fingers 7 and 8 be operated together, and the cranks advanced, only one crank will engage the shaft 3 as only one notch will be opposite its engaging plunger. When the shaft has been turned to the neutral position, the other plunger will come opposite its notch causing the then free crank to engage the shaft 3, and as both cranks tend to rotate the shaft in opposite directions, the rotation of the shaft will be stopped at the neutral position. The neutral button shown in Fig. 6 operates both solenoids 15 and 16 to accomplish this.

A switch box containing contact disks can be used in lieu of the contact buttons, said box comprising a casing 36 having a detachable side plate 37 held in position by a bolt 38 and a nut 39. The bolt 38 serves functionally as an axis for two insulated disks 40 and 41 also as a pivot for the inner resilient end of an arm 42 that extends through a slot 43 provided therefor in the edge of the casing 36. The insulated disks have the peripheries thereof provided with contact plates or blocks 44 corresponding to the contacts shown in Fig. 6. The arm 42 has a spring pressed plunger 45, said plunger having the inner end thereof provided with a contact head or bar 46 adapted to bridge the disks 40 and 41 and connect contacts of said disks. The outer end of the plunger 45 has a button 47 and encircling said plunger between the button 47 and the end of the arm is a coiled spring 48 a portion of said spring being housed by a handle 49 mounted upon the end of the arm.

The resilient inner end of the arm holds said arm normally in notches 50 provided therefor in one of the walls of the slot 43, whereby said arm will be held against accidental displacement, when adjusted to permit of the plunger 45 being moved to connect proper contacts and complete a circuit through proper solenoids to operate gear shifting fingers or cranks. The electrical connections between the contacts of the disk 41 are best shown in Figs. 10 and 11, and the switch box can be conveniently secured to a steering column or located convenient to the operator of the car. The contact buttons shown in Fig. 6 can preferably be embodied in the rim of a steering wheel whereby the gear shifting mechanism can be operated without the driver removing the hands from the wheel.

A mechanical device that can be installed in addition to the electrical means and be used in lieu of the electrical means should the same become impaired is shown in Fig. 12. The device comprises a series of bell cranks 51, one of which is illustrated as engaging the armature of the solenoid and as connected to a rod 52, which can be manually operated.

Another mechanical device that can be used in lieu of electrical means is illustrated in Figs. 13, 14 and 15. A shaft 53 is revolubly mounted upon the frames 1 in proximity to the shaft 3. The shaft 53 has a series of cams 65 and 54 for mechanically moving the cores of the solenoids 29 and 29ª, respectively. The shaft 53 also has a series of cams 66, 67, 68 and 69 for mechanically moving the cores of the solenoids 15 and 16. By this arrangement either of the arms 7 or 8 can be connected to the shaft 3 at the same time that either arm 24 is attached to said shaft. Mounted upon the shaft 53 is a beveled gear wheel 55 meshing with a smaller wheel 56, carried by a shaft 57. The shaft 57 is geared to a shaft 58 that has a crank 59 movable over a quadrant 60, which is graduated whereby proper movement can be imparted to the shafts 57 and 53 to move the desired cams and gear shifting fingers or cranks.

In operation, it is apparent that when the tread lever is advanced, the clutch A is disengaged or released and at the same time the finger or crank 7 turns clock-wise and the finger or crank 8 turns counter-clock-wise. By engaging the finger or crank 7 with the shaft 3, through the electrical or mechanical means described, the shaft 3 will turn clock-wise when the clutch is released. Similarly, if the finger or crank 8 is caused to engage the shaft 3, the shaft will turn counter-clock-wise.

The transmission gears are shifted by causing one of the fingers or cranks 24 to engage the shaft 3 and rotate the shaft in the required direction by means of the tread lever previously mentioned. By reference to Fig. 5, it will be observed that if the plunger 32 is depressed, so as to engage the shaft 3 and the shaft is then rotated in either direction, the concave face of the solenoid 30 will hold the plunger 32 in engagement with the shaft 3 until the finger or crank 24 is brought back to the center or vertical position, at which time, if free to do so, the plunger 32 will lift, disengaging the crank 24 from the shaft 3 and locking the crank in engagement with the solenoid 30. When the crank 24 is in this position, the gears actuated by said crank are in the free or neutral position.

After the gears have been drawn into mesh the cranks or fingers 7 and 8 are drawn back to the full line position, shown in Fig. 1, by the spring 14, both freely turning on the shaft 3, the beveled faces of the plungers 22 causing disengagement of the fingers 7 and 8 from the shaft 3.

The operation of drawing out of mesh and into the neutral position will now be considered. When the shaft 3 has been turned in one direction and the gear engaged, and the cranks 7 and 8 have been drawn back to the full line position, as in Fig. 1, the notch 4 in the shaft 3 will be in position to be engaged by the finger or crank 7 or 8 which turns the shaft 3 into proper position to disengage the mesh gears. To withdraw the gear from mesh, it is only necessary to engage the shaft with this particular finger or crank and then advance the crank far enough to bring the gear to the free or neutral position.

In Fig. 3, the shaft 3 is shown in the position it would take when said shaft has been turned to its maximum counter-clockwise position, which position it assumes when a gear has been slid forward into full mesh. It is to be noted that if the plunger 22 is caused to engage the shaft 3 and the crank 7 is advanced, the shaft 3 will turn clockwise, thus drawing the meshed gear out of mesh and into the neutral position. When the gear reaches this position it will become automatically locked, as above described.

Again, in Fig. 4, the shaft 3 is shown in the position it will assume when said shaft has been turned the maximum distance in a clockwise direction, and it is to be noted that the notch 4 is in position to permit engagement of the plunger when it is desired to disengage the gears that have been shifted forward to disengage them.

To compensate for any movement of the solenoids relatively to the shaft 3, or vice versa, the concave faces 20 and 30 have been provided to ride against the ends of the plungers 22 and 31 or vice versa.

It is thought that the utility of my invention will be apparent without further description and while in the drawings there is illustrated the preferred embodiment of my invention it is to be understood that the structural elements are susceptible to such changes as in the size, shape and manner of assemblage as fall within the scope of the appended claims.

What I claim is:—

1. In a gear shifting mechanism, a transmission mechanism, a shaft, a clutch, electrically controlled means capable of being locked in said shaft to shift gears of said transmission mechanism by a movement of said shaft, said means being operatable with the actuation of said clutch, and means for controlling the operation of the first mentioned means.

2. In a gear shifting mechanism, a transmission mechanism, a clutch, a shaft, means shiftable into and out of said shaft and operatable in unison with said clutch for shifting gears of said transmission mechanism, and means including solenoids for controlling the operation of the first mentioned means.

3. In a gear shifting mechanism, a transmission mechanism, a clutch, a shaft, mechanical means operatable in unison with the operation of said clutch for shifting gears of said transmission mechanism, and electrical means including shaft engaging plungers for controlling the first mentioned means.

4. In gear shifting mechanism, a transmission mechanism, a member, means for rocking said member, fingers capable of being locked on said member to shift gears of said transmission mechanism, and means including plungers for locking said fingers.

5. In a gear shifting mechanism, the combination with a pedal control clutch and a slide gear transmission mechanism, of a shaft, fingers loosely mounted upon said shaft and movable with the pedal controlling said clutch, spring pressed plungers adapted to lock said fingers relatively to said shaft, and electro-mechanical means for holding said fingers in engagement with said shaft.

6. In a gear shifting mechanism the combination with a pedal controlled clutch, and a gear transmission mechanism, of a shaft, fingers loosely mounted upon said shaft and movable with the pedal controlling said clutch, plungers adapted to lock said fingers relatively to said shaft, and electrical means including solenoids and switches for actuating said plungers.

7. In a gear shifting mechanism, the combination with a clutch, and a gear transmission mechanism, of a shaft, fingers loosely mounted upon said shaft and movable simultaneously with the operating of said clutch, plungers adapted to lock said fingers relatively to said shaft, and mechanical means including cams for actuating said plungers.

8. In a gear shifting mechanism, the combination with a clutch, and a gear transmission mechanism, of a shaft, fingers loosely mounted upon said shaft and movable with said clutch, plungers adapted to lock said fingers relatively to said shaft, solenoids adapted to be energized to lock said fingers on said shaft, and means carried by said solenoids to compensate for any movement of said shaft relatively to said solenoids.

9. In a device of the class described, the combination of a transmission mechanism, a member carrying means for meshing the transmission mechanism gears, radially shiftable and electrically actuated means controlling the operation of said gear meshing means, and means for actuating said member.

10. The combination of a transmission mechanism, a clutch, a member carrying electrically controlled means for meshing the transmission mechanism gears and means shiftable in and out of said member for actuating said member simultaneously with the operation of said clutch.

11. The combination of a transmission mechanism, a clutch, a member carrying electrically controlled disengageable means shiftable in and out of said member for meshing the transmission mechanism gears and means for actuating said member automatically with the operation of the clutch.

12. The combination of a transmission mechanism, a clutch, a member carrying means for meshing the transmission mechanism gears, electrical means for shifting the first said means into the member and means shiftable into and out of said member for actuating said member.

13. In a gear shifting mechanism, a clutch, a transmission mechanism, fingers adapted to mesh gears of said transmission mechanism and electrically controlled means adapted to lock said fingers whereby the operation of said clutch causes said fingers to mesh gears of said transmission mechanism.

14. The combination of a transmission mechanism, a member carrying disengageable means for meshing the transmission mechanism gears, disengageable means for actuating said member, and a mechanically operated device for controlling the engagement of these disengageable means with said member.

15. The combination of a transmission mechanism, a member carrying disengageable means for meshing the transmission mechanism gears, disengageable means for actuating said member, and both mechanical and electrical devices for controlling the engagement of the disengageable means with said member.

16. In a gear shifting mechanism, the combination of a transmission mechanism, a clutch, a member carrying disengageable means, for shifting the transmission gears, and disengageable means for moving said member simultaneously with the operation of said clutch.

17. In a gear shifting mechanism, the combination of a transmission mechanism, a clutch, a member carrying disengageable means for shifting the transmission gears, and disengageable means whereby said member may be moved to permit operation of the clutch without shifting the gears.

18. In a gear shifting mechanism, the combination of a transmission mechanism, a clutch, a member carrying disengageable means for shifting the transmission gears, and disengageable means for moving said member in either direction as required in shifting the gear.

19. In a gear shifting mechanism, the combination of a transmission mechanism, a clutch, a member carrying disengageable means for shifting the transmission gears, and disengageable means operating simultaneously with said clutch for moving said member in either direction as required in shifting the gears.

In testimony whereof I affix my signature in presence of two witnesses.

FRANCIS S. DENNEEN.

Witnesses:
 LEWIS E. FLANDERS,
 ANNA M. DORR.